(12) United States Patent
Prieto

(10) Patent No.: US 10,435,549 B2
(45) Date of Patent: Oct. 8, 2019

(54) CARBON FIBER-FILLED THERMOPLASTIC OLEFINIC COMPOUNDS AND RELATED AUTOMOTIVE COMPONENTS

(71) Applicant: Equistar Chemicals, LP, Houston, TX (US)

(72) Inventor: Alberto Prieto, Lansing, MI (US)

(73) Assignee: Equistar Chemicals, LP, Houston, TX (US)

( * ) Notice: Subject to any disclaimer, the term of this patent is extended or adjusted under 35 U.S.C. 154(b) by 143 days.

(21) Appl. No.: 14/836,282

(22) Filed: Aug. 26, 2015

(65) Prior Publication Data

US 2016/0060440 A1 Mar. 3, 2016

Related U.S. Application Data

(60) Provisional application No. 62/043,266, filed on Aug. 28, 2014.

(51) Int. Cl.
| | |
|---|---|
| *C08L 23/08* | (2006.01) |
| *C08L 23/12* | (2006.01) |
| *C08L 23/14* | (2006.01) |
| *C08L 51/06* | (2006.01) |
| *C08K 7/06* | (2006.01) |
| *C08K 3/34* | (2006.01) |
| *C08K 9/08* | (2006.01) |
| *C08K 3/04* | (2006.01) |
| *C08L 23/16* | (2006.01) |
| *C08K 7/14* | (2006.01) |

(52) U.S. Cl.
CPC ............ *C08L 23/0815* (2013.01); *C08K 3/04* (2013.01); *C08K 3/34* (2013.01); *C08K 7/06* (2013.01); *C08K 7/14* (2013.01); *C08L 23/12* (2013.01); *C08L 23/14* (2013.01); *C08L 23/147* (2013.01); *C08L 23/16* (2013.01); *C08L 51/06* (2013.01); *C08L 2205/02* (2013.01); *C08L 2205/025* (2013.01); *C08L 2205/03* (2013.01); *C08L 2205/035* (2013.01); *C08L 2207/02* (2013.01)

(58) Field of Classification Search
CPC ...... C08L 23/12; C08L 23/16; C08L 23/0815; C08L 23/147; C08L 51/06; C08F 110/06; C08K 3/04; C08K 7/06
See application file for complete search history.

(56) References Cited

U.S. PATENT DOCUMENTS

| | | | |
|---|---|---|---|
| 5,717,000 A * | 2/1998 | Karande | ................ C08J 9/0066 521/143 |
| 5,880,198 A | 3/1999 | Kobayashi et al. | |
| 8,039,540 B2 | 10/2011 | Pelliconi et al. | |
| 2005/0143510 A1 | 6/2005 | Nakayama et al. | |
| 2006/0264557 A1 * | 11/2006 | Lustiger | .............. B29C 45/0005 524/451 |
| 2007/0219317 A1 * | 9/2007 | Uchikawa | .............. C08L 53/025 525/88 |
| 2009/0062426 A1 * | 3/2009 | Shiraki | .................. C08F 255/02 523/205 |
| 2012/0238688 A1 | 9/2012 | Washita | |
| 2016/0060440 A1 | 3/2016 | Prieto | |
| 2016/0376430 A1 * | 12/2016 | Kusumoto | .............. C08L 23/14 524/494 |

FOREIGN PATENT DOCUMENTS

| | | | |
|---|---|---|---|
| CN | 102482466 A | | 5/2012 |
| CN | 103160026 A | * | 6/2013 |
| CN | 103374180 A | * | 10/2013 .............. C08L 23/10 |
| EP | 2551299 A1 | | 1/2013 |
| EP | 2692794 A1 | | 2/2014 |
| JP | 2014028884 A | * | 2/2014 |

OTHER PUBLICATIONS

Dow Engage Polyolefin Elastomers Product Selection Guide (2015).*
Machine translation of JP 2014-028884 A.*
Machine translation of CN 103374180 A.*
Machine translation of CN-103160026-A.*
ASTM International, ASTM E831-14 (2014).*
International Search Report and Written Opinion dated Oct. 27, 2015 (Oct. 27, 2015) for Corresponding PCT/US2015/046960.

* cited by examiner

*Primary Examiner* — Kregg T Brooks

(57) ABSTRACT

The present disclosure provides a thermoplastic olefinic composition made from or containing: (A) a first polymer composition made from or containing a homopolymer polypropylene; (B) a second polymer composition made from or containing a polypropylene polymer grafted with an unsaturated monomer; (C) a third polymer composition made from or containing a first elastomeric ethylene copolymer; and (D) a carbon fiber composition made from or containing a carbon fiber coupled with a sizing composition. Optionally, the thermoplastic olefinic composition may be further made from or contain (a) a fourth polymer composition made from or containing a heterophasic polypropylene copolymer, (b) a fifth polymer composition made from or containing a second elastomeric ethylene composition, (c) an inorganic filler composition, (d) an additives composition, or (e) any combination of these components. The thermoplastic olefinic composition is suitable for use as a metal-replacement component, including automotive components.

13 Claims, No Drawings

CARBON FIBER-FILLED THERMOPLASTIC OLEFINIC COMPOUNDS AND RELATED AUTOMOTIVE COMPONENTS

CROSS REFERENCE TO RELATED APPLICATIONS

This application claims benefit of priority of U.S. Provisional Application No. 62/043,266 filed on Aug. 28, 2014, the contents of which are incorporated herein by reference in its entirety.

FIELD OF THE INVENTION

In general, the present disclosure relates to the field of chemistry. More specifically, the present disclosure relates to thermoplastic olefinic compounds useful as metal-replacement composites. In particular, the thermoplastic olefinic compounds are useful as automotive components.

BACKGROUND OF THE INVENTION

Some automotive components are made from engineered thermoplastic materials and blends. Those applications require certain physical characteristics, such as (i) Coefficients of Linear Thermal Expansion (CLTE) that approximate the CLTE of metal parts, (ii) low shrinkage, and (iii) very high stiffness. Aluminum has a CLTE value of $2.5 \times 10^{-5}$ mm/mm/° K while steel has a CLTE value of $1.1 \times 10^{-5}$ mm/mm/° K.

Such automotive components include body panels, lift gates, structural parts, and other automotive parts. Examples of engineered thermoplastic materials and blends include polyamide (PA), polyamide/acrylonitrile butadiene styrene (PA/ABS), polycarbonate (PC), PC/ABS, polycarbonate/acylonitrile styrene acrylate (PC/ASA), and polycarbonate/polybutylene terephthalate (PC/PBT).

SUMMARY OF THE INVENTION

In general embodiments, the present disclosure provides a thermoplastic olefinic composition made from or containing (A) a homopolymer polypropylene, (B) a polypropylene polymer grafted with an unsaturated monomer, (C) an elastomeric ethylene copolymer, and (D) a carbon fiber coupled with a sizing composition.

In some embodiments, the present disclosure provides a thermoplastic olefinic composition made from or containing:
   (A) a first polymer composition made from or containing a homopolymer polypropylene;
   (B) a second polymer composition made from or containing a polypropylene polymer grafted with an unsaturated monomer;
   (C) a third polymer composition made from or containing a first elastomeric ethylene copolymer; and
   (D) a carbon fiber composition made from or containing a carbon fiber coupled with a sizing composition.

Optionally, the thermoplastic olefinic composition may be further made from or contain (a) a fourth polymer composition made from or containing a heterophasic polypropylene copolymer, (b) a fifth polymer composition made from or containing a second elastomeric ethylene composition, (c) an inorganic filler composition, (d) an additives composition, or (e) any combination of these components. The thermoplastic olefinic composition is suitable for use as a metal-replacement component, including automotive components.

In further embodiments, the present disclosure provides a thermoplastic olefinic composition made from or containing:
   (A) from about 10 to about 25 weight percent of a first polymer composition, relative to the total weight of the thermoplastic olefinic composition, made from or containing a homopolymer polypropylene;
   (B) from about 0.2 to about 5.0 weight percent of a second polymer composition, relative to the total weight of the thermoplastic olefinic composition, made from or containing a polypropylene polymer grafted with an unsaturated monomer;
   (C) from about 15 to about 45 weight percent of a third polymer composition, relative to the total weight of the thermoplastic olefinic composition, made from or containing a first elastomeric ethylene copolymer;
   (D) from about 1 to about 20 weight percent of a carbon fiber composition, relative to the total weight of the thermoplastic olefinic composition, made from or containing a carbon fiber coupled with a sizing composition;
   (E) from about 0 to about 25 weight percent of a fourth polymer composition, relative to the total weight of the thermoplastic olefinic composition, made from or containing a heterophasic polypropylene copolymer;
   (F) from about 0 to about 25 weight percent of a fifth polymer composition, relative to the total weight of the thermoplastic olefinic composition, made from or containing a second elastomeric ethylene copolymer;
   (G) from about 0 to about 40 weight percent of an inorganic filler composition, relative to the total weight of the thermoplastic olefinic composition, made from or containing an inorganic filler; and
   (H) from about 0 to about 10 weight percent of an additives composition, relative to the total weight of the thermoplastic olefinic composition, having one or more additives.

In further embodiments, the present disclosure provides an automotive component made from or containing:
   (A) a first polymer composition made from or containing a homopolymer polypropylene;
   (B) a second polymer composition made from or containing a polypropylene polymer grafted with an unsaturated monomer;
   (C) a third polymer composition made from or containing a first elastomeric ethylene copolymer; and
   (D) a carbon fiber composition made from or containing a carbon fiber coupled with a sizing composition.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a convenient means for identifying discrete activities or ingredients and the recited lettering can be arranged in any sequence, unless expressly indicated.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the term "additives composition" refers to a composition made from or containing at least one additive.

In the present description, the term "α-olefin" or "alpha-olefin" means an olefin of formula $CH_2$=CH—R, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the terms "coupled" or "coupling" refers to the adhering of a sizing composition to a carbon fiber, wherein the sizing composition may be covalently-bonded to the carbon fiber, physically-entangled with the carbon fiber, distributed amongst or along the carbon fiber, and/or structurally-aligned with the carbon fiber. The coupling may involve secondary and/or tertiary structures of the sizing composition and the carbon fiber.

In the present description, the term "dX value" where X is 50 or 98 and is the measured particle diameter upper limit for particles falling within the bottom 50% or 98% by mass, respectively, of the particle distribution. For example, a d50 value of 0.3 μm means 50% of the particles in the distribution by mass have a diameter of greater than 0.3 μm and 50% of the particles by mass have a diameter lower than 0.3 μm. The d50 value is also referred to as the median or average particle size herein.

In the present description, the term "elastomer" refers to polymer compounds having rubber-like properties and crystallinity in the range of from about 0 percent to about 20 percent. The polymer can have crystallinity in the range of from about 0 percent to about 5 percent.

In the present description, the term "elastomeric ethylene copolymer composition" refers to a composition made from or containing at least one elastomeric ethylene copolymer.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that may be used herein include "second," "third," "fourth," etc.

In the present description, the term "grafted polyolefin" refers to a polyolefin grafted with an unsaturated monomer. The unsaturated monomer can be an unsaturated polar monomer. The unsaturated monomer can contain one or more oxygen atoms.

In the present description, the term "grafted polyolefin composition" refers to a composition made from or containing at least one grafted polyolefin.

In the present description, the term "heterophasic polypropylene copolymer" refers to copolymer prepared by the copolymerization of ethylene and propylene into a polypropylene matrix. The base polypropylene may be a homopolymer or a copolymer.

In the present description, the term "homopolymer" and similar terms mean a polymer consisting solely or essentially all of units derived from a single kind of monomer, e.g., ethylene homopolymer is a polymer comprising solely or essentially all of units derived from ethylene, propylene homopolymer is a polymer comprising solely or essentially all of units derived from propylene, and the like.

In the present description, the term "interpolymer" means a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., —$CH_2$—$CH_2$—, and not the monomer itself, e.g., $CH_2$=$CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from or containing at least one polymer.

In the present description, the term "polyolefin" is used herein broadly to include polymers such as polyethylene, ethylene-alpha olefin copolymers (EAO), polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description, the term "room temperature" refers to a temperature around 25 degrees Celsius.

In the present description, the term "sizing composition" refers to an agent for treating carbon fibers. The agent may be made from or contain a variety of materials, including epoxies, nylons, urethanes, and the like. In some embodiments, the sizing composition may be applied in the form of (a) an aqueous resin dispersion or (b) a solution of the resin dissolved in an organic solvent.

In the present description, the term "thermoplastic polymer" means a polymer that softens when exposed to heat and returns to its original condition when cooled to room temperature.

Testing

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

Throughout the present description and claims, all the standard melt index values of polyethylene polymers are measured according to ASTM D 1238, using a piston load of 2.16 kg and at a temperature of 190 degrees Celsius. Throughout the present description and claims, all the standard melt flow rate values of polypropylene polymers are measured according to ASTM D 1238, using a piston load of 2.16 kg and at a temperature of 230 degrees Celsius.

ASTM D 3763 is entitled "Standard Test Method for High Speed Puncture Properties of Plastics Using Load and Displacement Sensors." The term "ASTM D 3763" or "Instrumented Dart Impact Test" as used herein refers to the test method covering the determination of puncture properties of rigid plastics over a range of test velocities. This test method is designed to provide load versus deformation response of plastics under essentially multiaxial deformation conditions at impact velocities. This test method further provides a measure of the rate sensitivity of the material to impact. This test method was approved on Jul. 1, 2010 and published July 2010, the contents of which are incorporated herein by reference in its entirety. For the referenced ASTM standards, visit the ASTM website, www.astm.org, or contact ASTM Customer Service at service@astm.org.

ASTM E 831 is entitled "Standard Test Method for Linear Thermal Expansion of Solid Materials by Thermomechanical Analysis." The term "ASTM E 831" as used herein refers to the test method for determining the technical coefficient of linear thermal expansion of solid materials using thermomechanical analysis techniques. This test method is applicable to solid materials that exhibit sufficient rigidity over the test temperature range. This test method was published in 2013, the contents of which are incorporated herein by reference in its entirety. For the referenced ASTM standards, visit the ASTM website, www.astm.org, or contact ASTM Customer Service at service@astm.org.

ASTM E 1356 is entitled "Standard Test Method for Assignment of the Glass Transition Temperatures by Differential Scanning calorimetry." The term "ASTM E1356" as used herein refers to a rapid test method for determining changes in specific heat capacity in a homogeneous material, wherein the glass transition is manifested as a step change in specific heat capacity. This test method is applicable to amorphous materials or to partially crystalline materials containing amorphous regions, that are stable and do not undergo decomposition or sublimation in the glass transition region. This test method was published in 2008, the contents of which are incorporated herein by reference in its entirety. For the referenced ASTM standards, visit the ASTM website, www.astm.org, or contact ASTM Customer Service at service@astm.org.

ISO 75 is entitled "Determination of Temperature of Deflection under Load." The term "ISO 75" as used herein refers to the test methods for the determination of the temperature of deflection under load (flexural stress under three-point loading) of plastics. Different types of test specimen and different constant loads are defined to suit different types of material. ISO 75-2 gives specific requirements for plastics (including filled plastics and fibre-reinforced plastics in which the fiber length, prior to processing, is up to 7.5 mm) and ebonite, while ISO 75-3 gives specific requirements for high-strength thermosetting laminates and long-fiber-reinforced plastics in which the fiber length is greater than 7.5 mm. The methods specified are for assessing the relative behavior of different types of material at elevated temperature under load at a specified rate of temperature increase. The results obtained do not necessarily represent maximum applicable temperatures because in practice essential factors, such as time, loading conditions and nominal surface stress, can differ from the test conditions. True comparability of data can be achieved for materials having the same room-temperature flexural modulus.

ISO 178 is entitled "Plastics—Determination of Flexural Properties." The term "ISO 178" as used herein refers to the standard test method for testing the flexural properties of a material. In particular, the flexural test measures the force required to bend a beam under three point loading conditions. The data can be used to select materials for parts that will support loads without flexing. Flexural modulus is used as an indication of a material's stiffness when flexed. Since the physical properties of many materials can vary depending on ambient temperature, it is sometimes appropriate to test materials at temperatures that simulate the intended end use environment. The specimen can lie on a support span and the load is applied to the center by the loading nose producing three point bending at a specified rate. The parameters for this test are the support span, the speed of the loading, and the maximum deflection for the test. These parameters are based on the test specimen thickness and are defined differently by ASTM and ISO standards. For ASTM D 790, the test is stopped when the specimen reaches 5% deflection or the specimen breaks before 5%. For ISO 178, the test is stopped when the specimen breaks. Of the specimen does not break, the test is continued as far as possible and the stress at 3.5% (conventional deflection) is reported. A variety of specimen shapes can be used for this test, including the specimen size for ASTM of 3.2 mm×12.7 mm×125 mm (0.125"×0.5"×5.0") and for ISO of 10 mm×4 mm×80 mm. By using the flexural text, the following data may be obtained: flexural stress at yield, flexural strain at yield, flexural stress at break, flexural strain at break, flexural stress at 3.5% (ISO) or 5.0% (ASTM) deflection, and flexural modulus.

ISO 180 is entitled "Determination of Izod Impact Strength." The term "ISO 180" as used herein refers to the test method for determining the Izod impact strength of plastics under defined conditions. A number of different types of specimen and test configurations are defined. Different test parameters are specified according to the type of material, the type of test specimen and the type of notch.

ISO 527 is entitled "Plastics—Determination of Tensile Properties." The term "ISO 527" as used herein refers to the test methods for determining the tensile properties of plastics and plastic composites under defined conditions. Several different types of test specimen are defined to suit different types of material. The methods are used to investigate the tensile behavior of the test specimens and for determining the tensile strength, tensile modulus and other aspects of the tensile stress/strain relationship under the conditions defined.

ISO 1183 is entitled "Methods for Determining the Density of Non-Cellular Plastics." The term "ISO 1183" as used herein refers to the test method for for the determination of the density of non-cellular molded or extruded plastics in void-free form. In this gradient column method, density gradient columns are columns containing a mixture of two liquids, the density in the column increasing uniformly from top to bottom.

ISO 2577 is entitled "Plastics—Thermosetting Moulding Materials—Determination of Shrinkage." The term "ISO 2577" as used herein refers to the test method for determining the moulding shrinkage and the shrinkage after heat treatment of moulded test specimens of thermosetting moulding materials.

Incorporated Unsaturated Monomer (Weight Percent): The amount of the unsaturated monomer incorporated into the grafted polyolefin can be measured by wet chemical methods (titration, etc.) or Fourier transform infrared spectroscopy (FTIR).

"Molecular Weight Distribution (Mw/Mn)" is measured by gel permeation chromatography. MWD and the ratio $M_w/M_n$ are determined using a Waters 150-C ALC/Gel Permeation Chromatography (GPC) system equipped with a TSK column set (type GMHXL-HT) working at 135 degrees Celsius with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140 degrees Celsius for 1 hour. The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) are used as standard.

"X-Ray Crystallinity" is measured with an X-ray Diffraction Powder Diffractometer using the Cu—Kα1 radiation with fixed slits and collecting spectra between diffraction angle 2Θ=5° and 2Θ=35° with step of 0.1° every 6 seconds. Measurements are performed on compression molded specimens in the form of disks of about 1.5 to about 2.5 mm of thickness and about 2.5 to about 4.0 cm of diameter. These specimens are obtained in a compression molding press at a temperature of about 200 degrees Celsius±5 degrees Celsius without any appreciable applied pressure for 10 minutes, then applying a pressure of about 10 kg/cm² for about few second and repeating this last operation for 3 times. The diffraction pattern is used to derive all the components necessary for the degree of crystallinity by defining a suitable linear baseline for the whole spectrum and calculating the total area (Ta), expressed in counts/sec·2Θ, between the spectrum profile and the baseline. Then a suitable amorphous profile is defined, along the whole spectrum, that separate, according to the two-phase model, the amorphous regions from the crystalline ones. Thus it is possible to calculate the amorphous area (Aa), expressed in counts/sec·2Θ, as the area between the amorphous profile and the baseline; and the crystalline area (Ca), expressed in counts/sec·2Θ, as Ca=Ta−Aa. The degree of crystallinity of the sample is then calculated according to the formula:

percent Cr=100×Ca/Ta

Xylene Solubles for Polymers (percent by weight): 2.5 g of polymer are dissolved in 250 ml of xylene, at 135 degrees Celsius, under agitation. After 20 minutes, the solution is cooled to 0 degrees Celsius under stirring, and then it is allowed to settle for 30 minutes. The precipitate is filtered with filter paper; the solution is evaporated under a nitrogen current, and the residue dried under vacuum at 140 degrees Celsius until constant weight. The weight percentage of polymer soluble in xylene at 0 degrees Celsius is then calculated. The percent by weight of polymer insoluble in xylene at room temperature is considered the isotactic index of the polymer.

In a general embodiment, the present disclosure provides a thermoplastic olefinic composition made from or containing:
  (A) a first polymer composition made from or containing a homopolymer polypropylene;
  (B) a second polymer composition made from or containing a polypropylene polymer grafted with an unsaturated monomer;
  (C) a third polymer composition made from or containing a first elastomeric ethylene copolymer; and
  (D) a carbon fiber composition made from or containing a carbon fiber coupled with a sizing composition.

In a general embodiment, the present disclosure provides a thermoplastic olefinic composition made from or containing:
  (A) from about 10 to about 25 weight percent of a first polymer composition, relative to the total weight of the thermoplastic olefinic composition, made from or containing a homopolymer polypropylene;
  (B) from about 0.2 to about 5.0 weight percent of a second polymer composition, relative to the total weight of the thermoplastic olefinic composition, made from or containing a polypropylene polymer grafted with an unsaturated monomer;
  (C) from about 15 to about 45 weight percent of a third polymer composition, relative to the total weight of the thermoplastic olefinic composition, made from or containing a first elastomeric ethylene copolymer;
  (D) from about 1 to about 20 weight percent of a carbon fiber composition, relative to the total weight of the thermoplastic olefinic composition, made from or containing a carbon fiber coupled with a sizing composition;
  (E) from about 0 to about 25 weight percent of a fourth polymer composition, relative to the total weight of the thermoplastic olefinic composition, made from or containing a heterophasic polypropylene copolymer;
  (F) from about 0 to about 25 weight percent of a fifth polymer composition, relative to the total weight of the thermoplastic olefinic composition, made from or containing a second elastomeric ethylene copolymer;

(G) from about 0 to about 40 weight percent of an inorganic filler composition, relative to the total weight of the thermoplastic olefinic composition, made from or containing an inorganic filler; and (H) from about 0 to about 10 weight percent of an additives composition, relative to the total weight of the thermoplastic olefinic composition, having one or more additives.

First Polymer Composition—Homopolymer Polypropylene

The first polymer composition is made from or contains a homopolymer polypropylene.

In an embodiment, the first polymer composition is present in an amount from about 10 to about 25 weight percent, relative to the total weight of the thermoplastic olefinic composition. In some embodiments, the first polymer composition is present in an amount from about 15 to about 25 weight percent, relative to the total weight of the thermoplastic olefinic composition. In other embodiments, the first polymer composition is present in an amount of 15, 16, 17, 18, 19, 20, 21, 22, 23, 24, or 25 weight percent, relative to the total weight of the thermoplastic olefinic composition.

In some embodiments, the homopolymer polypropylene has a melt flow rate in the range of about 1000 grams per 10 minutes to about 3000 grams per 10 minutes. The third homopolymer polypropylene can have a melt flow rate in the range of about 1500 grams per 10 minutes to about 2000 grams per 10 minutes.

Such homopolymer polypropylenes are commercially available as ADSTIF™ (LyondellBasell), METOCENE™ (LyondellBasell), and PROFAX™ (LyondellBasell) polymers.

Second Polymer Composition—Polypropylene Grafted with an Unsaturated Monomer

The second polymer composition is made from or contains a polypropylene polymer grafted with an unsaturated monomer.

In an embodiment, the second polymer composition is present in an amount from about 0.2 to about 5.0 weight percent, relative to the total weight of the thermoplastic olefinic composition. In other embodiments, the second polymer composition is present in an amount of 0.5, 1.0, 1.5, 2.0, 2.5, 3.0, 3.5, 4.0, 4.5, or 5.0 weight percent, relative to the total weight of the thermoplastic olefinic composition.

In some embodiments, the polypropylene polymer grafted with an unsaturated monomer is prepared by reacting a polypropylene polymer with unsaturated monomers at elevated temperatures, with or without a free-radical initiator, to graft unsaturated monomer units onto the polypropylene backbone. The grafting reaction can occur under an inert gas, such as nitrogen.

The polypropylene backbone can be polypropylenes, ethylene-propylene copolymers, impact-modified polypropylenes, and the like, and blends thereof.

Unsaturated monomers can be ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Other unsaturated monomers are described in U.S. Pat. No. 6,385,777 and U.S. Patent Application Publication No. 2007/0054142, the teachings of which are incorporated herein by reference.

The relative amounts of polypropylene and unsaturated monomer used will vary and depend on factors such as the nature of the polypropylene and the unsaturated monomer, the reaction conditions, the available equipment, and other factors. In some embodiments, the unsaturated monomer is used in an amount within the range of about 0.1 to about 15 weight percent, based on the total weight of the grafted polypropylene. The unsaturated monomer can be in the range of from about 0.5 to about 6 weight percent. In some embodiments, the range can be from about 1 to about 3 weight percent.

Grafting of the unsaturated monomer(s) to the polypropylene can be accomplished by heating a mixture of the unsaturated monomer(s) and the polypropylene. The grafted polypropylene can be prepared by melt blending the polypropylene with the unsaturated monomer in a shear-imparting extruder/reactor. Twin screw extruders such as those marketed by Coperion under the designations ZSK-53, ZSK-83, ZSK-90 and ZSK-92 are useful for performing the grafting step. A free-radical initiator such as an organic peroxide can be employed.

Such grafted polypropylene is commercially available as BONDYRAM™ (Polyram).

Third Polymer Composition—First Elastomeric Ethylene Copolymer

The third polymer composition is made from or contains a first elastomeric ethylene copolymer.

In an embodiment, the third polymer composition is present in an amount from about 15 to about 45 weight percent, relative to the total weight of the thermoplastic olefinic composition. In some embodiments, the third polymer composition is present in an amount from about 15 to about 25 weight percent, relative to the total weight of the thermoplastic olefinic composition. In other embodiments, the third polymer composition is present in an amount from about 35 to about 45 weight percent, relative to the total weight of the thermoplastic olefinic composition.

Examples of elastomeric ethylene copolymers include ethylene/alpha-olefin copolymers with at least one $C_3$ to $C_{10}$ alpha-olefin comonomer, and optionally, a polyene comonomer. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. In some embodiments, the elastomeric ethylene copolymer is an ethylene/alpha-olefin copolymers with (a) ethylene-derived units and (b) alpha-olefin comonomer units derived from at least one comonomer selected from the group consisting of $C_3$ to $C_{10}$ alpha-olefins. In other embodiments, the elastomeric ethylene copolymer is an ethylene/octene copolymer. In yet other embodiments, the ethylene/octene copolymer has a melt index from about 0.2 to about 3.0 grams per 10 minutes, a density from about 0.850 to about 0.900 grams per cubic centimeter, a total crystallinity from about 10 to about 20 percent, and a glass transition temperature from about −55 to about −50 degrees Celsius.

Exemplary elastomeric ethylene copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene, and ethylene/1,3,5-hexatriene. Exemplary elastomeric ethylene terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/ propylene/7-methyl-1,6-octadiene, ethylene/butene/7-methyl-1,6-octadiene, ethylene/1-octene/1,3-pentadiene, and ethylene/propylene/1,3,5-hexatriene. Exemplary elastomeric ethylene tetrapolymers include ethylene/propylene/l-octene/diene, ethylene/butene/l-octene/diene, and ethylene/propylene/mixed dienes.

Such elastomeric ethylene copolymers are commercially available as ENGAGE™ (The Dow Chemical Company), EXACT™ (ExxonMobil Chemical Company), or TAFMER™ (Mitsui Chemical) polymers.

Fourth Polymer Composition—Heterophasic Polypropylene Copolymer

The fourth polymer composition is made from or contains a heterophasic polypropylene copolymer.

In an embodiment, the fourth polymer composition is present in an amount from about 0 to about 25 weight percent, relative to the total weight of the thermoplastic olefinic composition. In some embodiments, the fourth polymer composition is present in an amount from about 15 to about 25 weight percent, relative to the total weight of the thermoplastic olefinic composition. In other embodiments, the fourth polymer composition is present in an amount of 15, 16, 17, 18, 19, 20, 21, 22, 23, 24, or 25 weight percent, relative to the total weight of the thermoplastic olefinic composition.

In an embodiment, the heterophasic polypropylene copolymer can have a melt flow rate in the range of about 50 grams per 10 minutes to about 200 grams per 10 minutes. The heterophasic polypropylene copolymer can have a melt flow rate in the range of about 80 grams per 10 minutes to about 150 grams per 10 minutes. In some embodiments, the melt flow rate will be in the range of from about 100 grams per 10 minutes to about 120 grams per 10 minutes.

In an embodiment, the heterophasic polypropylene copolymers for use in making the polymer blend can have a Percent Xylene Solubles in the range of about 5 weight percent to about 20 weight percent weight percent, based on the total weight of the heterophasic polypropylene copolymer. The heterophasic polypropylene copolymer can have a a Percent Xylene Solubles in the range of about 5 weight percent to about 15 weight percent weight percent, based on the total weight of the heterophasic polypropylene copolymer. In some embodiments, the heterophasic polypropylene copolymer will have a Percent Xylene Solubles of 5, 6, 7, 8, 9, 10, 11, 12, 13, 14, or 15 weight percent weight percent, based on the total weight of the heterophasic polypropylene copolymer.

The heterophasic polypropylene copolymer can be prepared by sequential polymerization in at least two stages and in the presence of Ziegler-Natta catalyst supported on a magnesium halide in active form.

The polymerization process, which can be continuous or batch, is carried out in liquid phase, in the presence or not of inert diluent, or in gas phase, or by mixed liquid-gas techniques.

The stereospecific polymerization catalysts comprise the product of the reaction between: 1) a solid component, containing a titanium compound and an electron-donor compound (internal donor) supported on magnesium dihalide; 2) an aluminum alkyl compound (cocatalyst); and, optionally, 3) an electron-donor compound (external donor).

Such heterophasic copolymers are commercially available as HIFAX™ (LyondellBasell) and PROFAX™ (LyondellBasell) polypropylene.

Fifth Polymer Composition—Second Elastomeric Ethylene Copolymer

The fifth polymer composition is made from or contains a second elastomeric ethylene copolymer.

In an embodiment, the fifth polymer composition is present in an amount from about 0 to about 25 weight percent, relative to the total weight of the thermoplastic olefinic composition. In some embodiments, the fifth polymer composition is present in an amount from about 15 to about 25 weight percent, relative to the total weight of the thermoplastic olefinic composition. In other embodiments, the fifth polymer composition is present in an amount of 15, 16, 17, 18, 19, 20, 21, 22, 23, 24, or 25 weight percent, relative to the total weight of the thermoplastic olefinic composition.

Examples of elastomeric ethylene copolymers include ethylene/alpha-olefin copolymers with at least one $C_3$ to $C_{10}$ alpha-olefin comonomer, and optionally, a polyene comonomer. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. In some embodiments, the elastomeric ethylene copolymer is an ethylene/alpha-olefin copolymers with (a) ethylene-derived units and (b) alpha-olefin comonomer units derived from at least one comonomer selected from the group consisting of $C_3$ to $C_{10}$ alpha-olefins. In other embodiments, the elastomeric ethylene copolymer is an ethylene/octene copolymer. In yet other embodiments, the ethylene/octene copolymer has a melt index from greater than about 3.0 to about 10.0 grams per 10 minutes, a density from about 0.850 to about 0.900 grams per cubic centimeter, a total crystallinity from about 15 to about 20 percent, and a glass transition temperature from about −55 to about −50 degrees Celsius.

Exemplary elastomeric ethylene copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene, and ethylene/1,3,5-hexatriene. Exemplary elastomeric ethylene terpolymers include ethylene/propylene/l-octene, ethylene/butene/l-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene, and ethylene/propylene/1,3,5-hexatriene. Exemplary elastomeric ethylene tetrapolymers include ethylene/propylene/l-octene/diene, ethylene/butene/l-octene/diene, and ethylene/propylene/mixed dienes.

Such elastomeric ethylene copolymers are commercially available as ENGAGE™ (The Dow Chemical Company), EXACT™ (ExxonMobil Chemical Company), or TAFMER™ (Mitsui Chemical) polymers.

Carbon Fiber Composition

The carbon fiber composition is made from or contains a carbon fiber coupled with a sizing composition.

In an embodiment, the carbon fiber composition is present in an amount from about 1 to about 20 weight percent, relative to the total weight of the thermoplastic olefinic composition. In some embodiments, the carbon fiber composition is present in an amount from about 1 to about 10 weight percent, relative to the total weight of the thermoplastic olefinic composition. In other embodiments, the carbon fiber composition is present in an amount of 1, 2, 3, 4, 5, 6, 7, 8, 9, or 10 weight percent, relative to the total weight of the thermoplastic olefinic composition.

The relative amounts of carbon fiber and sizing composition used will vary. In some embodiments, the sizing composition is used in an amount within the range of about 1.0 to about 10 weight percent, based on the total weight of the carbon fiber coupled with the sizing composition. The sizing composition can be in the range of from about 1.0 to about 7.0 weight percent. In some embodiments, the sizing composition is present in an amount of 1, 2, 3, 4, 5, 6, or 7 weight percent.

In some embodiments, the sizing composition can be material selected from the group consisting of epoxies, nylons, urethanes, and the like.

In some embodiments, the carbon fiber can have fiber length in the range of about 3 mm to about 25 mm. In other embodiments, the carbon fiber can have fiber length in the range of about 3 mm to about 12 mm. In some embodiments, the carbon fiber has a fiber length of 3, 4, 5, 6, 7, 8, or 9 mm.

Such carbon fibers are commercially available as TENAX™ (Teijin or Toho Tenax America, Inc.).

Inorganic Filler Composition

The inorganic filler composition is made from or contains an inorganic filler.

In an embodiment, the inorganic filler composition is present in an amount from about 0 to about 40 weight percent, relative to the total weight of the thermoplastic olefinic composition. In some embodiments, the inorganic filler composition is present in an amount from about 20 to about 30 weight percent, relative to the total weight of the thermoplastic olefinic composition. In other embodiments, the inorganic filler composition is present in an amount of 20, 21, 22, 23, 24, 25, 26, 27, 28, 29, or 30 weight percent, relative to the total weight of the thermoplastic olefinic composition.

Inorganic fillers include talc. Such talc is commercially available as ULTRA™.

Additives Composition

The additives composition is made from or contains one or more additives.

In an embodiment, the additives composition is present in an amount from about 0 to about 10 weight percent, relative to the total weight of the thermoplastic olefinic composition. In other embodiments, the additives composition is present in an amount of 1, 2, 3, 4, 5, 6, 7, 8, 9, or 10 weight percent, relative to the total weight of the thermoplastic olefinic composition.

Exemplary additives include colorants, odorants, deodorants, plasticizers, impact modifiers, nucleating agents, lubricants, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components. Such additives can be used in conventional amounts. In some embodiments, the amounts do not exceed 10 weight percent of the total composition.

In some embodiments, the present disclosure provides a thermoplastic olefinic composition having a melt flow rate at 190 degrees Celsius, 2.16 kg (ASTM D1238) in the range of about 1.5 grams per 10 minutes to about 11 grams per 10 minutes. In some embodiments, the thermoplastic olefinic composition can have a melt flow rate of 1.5, 2, 3, 4, 5, 6, 7, 8, 9, 10, or 11 grams per 10 minutes.

In some embodiments, the present disclosure provides a thermoplastic olefinic composition having a density (ISO 1183) in the range of about 0.98 grams per cubic centimeter to about 1.23 grams per cubic centimeter. In other embodiments, the thermoplastic olefinic composition can have a density (ISO 1183) in the range of about 1.10 grams per cubic centimeter to about 1.20 grams per cubic centimeter.

In some embodiments, the present disclosure provides a thermoplastic olefinic composition having a tensile strength at yield (ISO 527) in the range of about 18 MPa to about 40 MPa.

In some embodiments, the present disclosure provides a thermoplastic olefinic composition having a flexural stress (ISO 178) in the range of about 27 MPa to about 50 MPa.

In some embodiments, the present disclosure provides a thermoplastic olefinic composition having a flexural modulus (ISO 178) in the range of about 2300 MPa to about 5000 MPa. In other embodiments, the thermoplastic olefinic composition can have a flexural modulus in the range of about 2500 MPa to about 4500 MPa.

In some embodiments, the present disclosure provides a thermoplastic olefinic composition having a notched izod impact (ISO 180) in the range of about 12 $kJ/m^2$ to about 20 $kJ/m^2$. In some embodiments, the thermoplastic olefinic composition can have a notched izod impact of about 12, 13, 14, 15, 16, 17, 18, 19, or 20 $kJ/m^2$.

In some embodiments, the present disclosure provides a thermoplastic olefinic composition having a tool shrinkage (ISO 2577) in the range of about 0.05 percent to about 0.25 percent.

In some embodiments, the present disclosure provides a thermoplastic olefinic composition having a tool shrinkage after 120 degrees Celsius for 30 minutes in the range of about 0.05 percent to about 0.35 percent.

In some embodiments, the present disclosure provides a thermoplastic olefinic composition having a heat distortion temperature (HDT) @ 1.8 MPa (ISO 75) in the range of about 82 degrees Celsius to about 120 degrees Celsius.

In some embodiments, the present disclosure provides a thermoplastic olefinic composition having a coefficient of linear thermal expansion (CLTE) (ASTM E831) in the range of about $0.31 \times 10^{-5}$ mm/mm/° C. to about $2.1 \times 10^{-5}$ mm/mm/° C.

In further embodiments, the present disclosure provides an automotive component made from or containing:
(A) a first polymer composition made from or containing a homopolymer polypropylene;
(B) a second polymer composition made from or containing a polypropylene polymer grafted with an unsaturated monomer;
(C) a third polymer composition made from or containing a first elastomeric ethylene copolymer; and
(D) a carbon fiber composition made from or containing a carbon fiber coupled with a sizing composition.

EXAMPLES

The following examples are included to demonstrate embodiments of the invention. It should be appreciated by those of skill in the art that the techniques disclosed in the examples which follow represent techniques discovered by the inventor to function well in the practice of the invention, and thus can be considered to constitute exemplary modes for its practice. However, those of skill in the art should, in light of the present disclosure, appreciate that many changes can be made in the specific embodiments which are disclosed and still obtain a like or similar result without departing from the spirit and scope of the invention.

For the comparative examples and the examples of an embodiment of the present invention, various compounds were formulated to prepare test specimen. The materials were admixed in the weight percents shown in Table 1.

Homopolymer Polypropylene: LyondellBasell's METOCENE™ MF650Y (Melt Flow Rate at 230 degrees Celsius, 2.16 kg (ASTM D1238): 1800 grams per 10 minutes; Density of 0.91 grams per cubic centimeter; $M_w/M_n$: 3.2; $M_n$: 1.56E+04; $M_w$: 5.0E+04; $M_z$: 1.08E+05; and $M_{z+1}$: 1.68E+05).

Polypropylene Polymer Grafted with an Unsaturated Monomer: Polyram's BONDYRAM™ 1001 maleic anhydride grafted polypropylene (Melt Flow Rate at 230 degrees Celsius, 2.16 kg (ASTM D1238): 100 grams per 10 minutes: Density of 0.90 grams per cubic centimeter).

Heterophasic Polypropylene Copolymer: LyondellBasell's PROFAX™ EP501V (Melt Flow Rate at 230 degrees Celsius, 2.16 kg (ASTM D1238): 100 grams per 10 minutes; Density of 0.900 grams per cubic centimeter; Percent Xylenes Soluble (weight percent): 11.7; $M_w/M_n$: 5.49; $M_n$: 2.99E+04; $M_w$: 1.64E+05; $M_z$: 6.34E+05; and $M_{z+1}$: 1.48E+06).

Elastomeric Ethylene Copolymers: The Dow Chemical Company's ENGAGE™ 8150 ethylene/octene copolymer (Melt Index at 190 degrees Celsius, 2.16 kg (ASTM D1238): 0.5 grams per 10 minutes; Density: 0.868 grams per cubic centimeter; Tg: −52 degrees Celsius; Crystallinity: 16; i.e., first elastomeric ethylene copolymer) and The Dow Chemical Company's ENGAGE™ 8200 ethylene/octene copolymer (Melt Index at 190 degrees Celsius, 2.16 kg (ASTM D1238): 5.0 grams per 10 minutes; Density: 0.870 grams per cubic centimeter; Tg: −53 degrees Celsius; Crystallinity: 19; i.e., second elastomeric ethylene copolymer).

Carbon Fiber: Teijin's TENAX™-A HT C804 carbon fiber (Fiber Length: 6.0 mm; Fiber diameter: 7.0 μm; Sizing: 4.0%).

Glass Fiber: PPG's CHOPVANTAGE™ 3299 glass fiber (Fiber Length: 3.2 mm; Fiber Diameter: 13 μm).

Inorganic Filler: Imi Fabi ULTRA™ 5C talc (Median Particle Size (d50): 0.65 μm; Top Cut (d98): 4.5 μm).

Additives: Carbon black masterbatch (50% carbon black masterbatch in polyethylene); B225™ which is a 1:1 blend of IRGANOX™ 1010 sterically-hindered phenolic antioxidant and IRGAFOS™ 168 trisarylphosphite processing stabilizer; Calcium stearate lubricant; and Slip agent.

Compound Preparation

A pre-compound free of carbon fiber was compounded in a 50-mm Werner & Pfleiderer ZSK twin screw extruder. Polypropylene resins, elastomers, and additives were added in the main feeder. Talc was side fed downstream. Strands of the pre-compound were submerged in water and pelletized. Afterwards, pellets were blended to get a homogenous product.

Pelletized pre-compound was fed in a 50-mm twin screw extruder designed to handle carbon fibers. The carbon fiber was added downstream. Strands of the molten composite were submerged in water and pelletized afterwards. Pellets were blended and dried at 85 degrees Celsius for 2 hours.

Sample Preparation

Dried pellets were injection molded at a melt temperature of 215.5 degrees Celsius (420° F.) in a Van Dorn 120 injection molding machine to produce ISO standard tensile bars and 152.4 mm×101.6 mm (6 inch×4 inch) smooth plaques for mechanical testing.

TABLE 1

| Component*/Test | C. Ex. 1 | Ex. 2 | Ex. 3 | C. Ex. 4 | Ex. 5 |
|---|---|---|---|---|---|
| homopolymer polypropylene | 24.2 | 23 | 18 | 18 | 13 |
| grafted polyolefin | 0.53 | 0.5 | 0.5 | 0.5 | 0.5 |
| heterophasic polypropylene | | | | | 17.6 |
| first elastomeric ethylene copolymer | 42.1 | 40 | 40 | 40 | 19 |
| second elastomeric ethylene copolymer | | | | | 18.4 |
| carbon fiber | | 5 | 10 | | 5 |
| glass fiber | | | | 10 | |
| talc | 31.58 | 30 | 30 | 30 | 25 |
| carbon black masterbatch | 1.05 | 1.0 | 1.0 | 1.0 | 1.0 |
| B225 ™ | 0.32 | 0.3 | 0.3 | 0.3 | 0.3 |
| calcium stearate lubricant | 0.11 | 0.1 | 0.1 | 0.1 | 0.1 |
| slip agent | 0.11 | 0.1 | 0.1 | 0.1 | 0.1 |
| Total | 100 | 100 | 100 | 100 | 100 |
| Melt Flow Rate @ 230° C., 2.16 kg (ASTM D1238) - g/10 min | 8.1 | 5.8 | 2.5 | 4.2 | 10.0 |
| Density (ISO 1183) - g/cc | 1.13 | 1.15 | 1.19 | 1.21 | 1.11 |
| Tensile Strength at Yield (ISO 527) - MPa | 10.6 | 18.6 | 23.6 | 15.2 | 32.0 |
| Flexural Stress (ISO 178) - MPa | 13.5 | 27.6 | 32.0 | 18.7 | 44.0 |
| Flexural Modulus (ISO 178) - MPa | 951 | 2462 | 2850 | 1513 | 4040 |
| Notched Izod Impact at 23° C. (ISO 180) - kJ/m$^2$ | 39.9 | 13.9 | 16.2 | 23.0 | 13.7 |
| Tool Shrinkage (ISO 2577) - % | 0.34 | 0.18 | 0.13 | 0.21 | 0.16 |
| Tool Shrinkage after 120° C. for 30 min. - % | 0.38 | 0.21 | 0.15 | 0.25 | 0.19 |
| HDT @ 1.8 MPa (ISO 75) - ° C. | 66 | 117 | 105 | 72.1 | 85.2 |
| CLTE** (ASTM E831) - × $10^{-5}$ mm/mm/° C. | 3.15 | 0.69 | 0.34 | | 1.9 |
| Multiaxial Instrumented Impact, 2.2 m/s 23° C. (ASTM D 3763) - J | Ductile | Ductile | Ductile | | Ductile |

*All weight percentages are based upon the total weight of the final composition.
**Measured as the average of the result obtained in the directions parallel and perpendicular to flow Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A thermoplastic olefinic composition comprising:
   (A) 10-25% by weight of a first polymer composition comprising a homopolymer polypropylene, wherein the homopolymer polypropylene has a melt flow rate (ASTM D1238; 230° C., 2.16 kg) in the range of about 1000 grams per 10 minutes to about 3000 grams per 10 minutes;
   (B) 0.2-5.0% by weight of a second polymer composition comprising a polypropylene polymer grafted with an unsaturated monomer;
   (C) 16-45% by weight of a third polymer composition comprising a first elastomeric ethylene copolymer;
   (D) 1-10% by weight of a carbon fiber composition comprising a carbon fiber coupled with a sizing composition; and
   (E) 20-30% by weight of an inorganic filler composition.

2. The thermoplastic olefinic composition of claim 1, wherein the homopolymer polypropylene has a melt flow rate (ASTM D1238; 230° C., 2.16 kg) in the range of about 1500 grams per 10 minutes to about 2000 grams per 10 minutes.

3. The thermoplastic olefinic composition of claim 1, wherein the first elastomeric ethylene copolymer comprises:
   (A) ethylene-derived units and
   (B) alpha-olefin comonomer units derived from at least one comonomer selected from the group consisting of $C_3$ to $C_{10}$ alpha-olefins.

4. The thermoplastic olefinic composition of claim 3, wherein the first elastomeric ethylene copolymer is an ethylene/octene copolymer having a melt index (ASTM D1238; 190° C., 2.16 kg) from about 0.2 to about 3.0 grams per 10 minutes, a density from about 0.850 to about 0.900 grams per cubic centimeter, an X-ray crystallinity from about 10 to about 20 percent, and a glass transition temperature (ASTM E 1356; 2008) from about −55 to about −50 degrees Celsius.

5. The thermoplastic olefinic composition of claim 1, wherein the sizing composition coupled to the carbon fiber is selected from the group consisting of epoxy, nylon and urethane.

6. The thermoplastic olefinic composition of claim 1, further comprising: a fourth polymer composition comprising a heterophasic polypropylene copolymer.

7. The thermoplastic olefinic composition of claim 6, wherein the heterophasic polypropylene copolymer has a melt flow rate (ASTM D1238; 230° C., 2.16 kg) in the range of about 50 grams per 10 minutes to about 200 grams per 10 minutes.

8. The thermoplastic olefinic composition of claim 1, further comprising: a fifth polymer composition comprising a second elastomeric ethylene copolymer, wherein the second elastomeric ethylene copolymer is an ethylene/octene copolymer having a melt index (ASTM D1238, Condition E; 190° C., 2.16 kg) from greater than about 3.0 to about 10.0 grams per 10 minutes, a density from about 0.850 to about 0.900 grams per cubic centimeter, an X-ray crystallinity from about 15 to about 20 percent, and a glass transition temperature from about −55 to about −50 degrees Celsius.

9. The thermoplastic olefinic composition of claim 1, wherein the inorganic filler is talc.

10. The thermoplastic olefinic composition of claim 1, further comprising 1 to 10% by weight of an additives composition, the additives composition comprising one or more of colorants, odorants, deodorants, plasticizers, impact modifiers, nucleating agents, lubricants, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components.

11. The thermoplastic olefinic composition of claim 10, further comprising:
   from about 0 to about 25 weight percent of a fourth polymer composition, relative to the total weight of the thermoplastic olefinic composition, comprising: a heterophasic polypropylene copolymer;
   from about 0 to about 25 weight percent of a fifth polymer composition, relative to the total weight of the thermoplastic olefinic composition, comprising: a second elastomeric ethylene copolymer; and
   from greater than 1 to less than 10 weight percent of the additives composition, relative to the total weight of the thermoplastic olefinic composition, having one or more additives.

12. The thermoplastic olefinic composition of claim 1, wherein the thermoplastic olefinic composition has a melt flow rate (ASTM D1238; 230° C., 2.16 kg) in the range of about 1.5 grams per 10 minutes to about 11 grams per 10 minutes.

13. An automotive component comprising the thermoplastic olefinic composition of claim 1.

* * * * *

UNITED STATES PATENT AND TRADEMARK OFFICE
CERTIFICATE OF CORRECTION

PATENT NO. : 10,435,549 B2
APPLICATION NO. : 14/836282
DATED : October 8, 2019
INVENTOR(S) : Prieto It is certified that error appears in the above-identified patent and that said Letters Patent is hereby corrected as shown below:

In the Specification

In Column 7, Line 26, after "method for" delete "for"
In Column 8, Line 1, delete "second" and insert -- seconds --, therefor
In Column 11, Line 39, after "about 20" delete "weight percent"
In Column 11, Line 41, after "have" delete "a"
In Column 11, Line 43, after "about 15" delete "weight percent"
In Column 11, Line 47, after "or 15" delete "weight percent"

Signed and Sealed this
Nineteenth Day of July, 2022

Katherine Kelly Vidal
*Director of the United States Patent and Trademark Office*